M. F. HARDNETT.
BICYCLE FRAME.
APPLICATION FILED DEC. 2, 1916.

1,222,398.

Patented Apr. 10, 1917.
3 SHEETS—SHEET 1.

Witnesses
Frederick L. Fox.
J. W. Garner

Inventor
M. F. Hardnett
By Victor J. Evans
Attorney

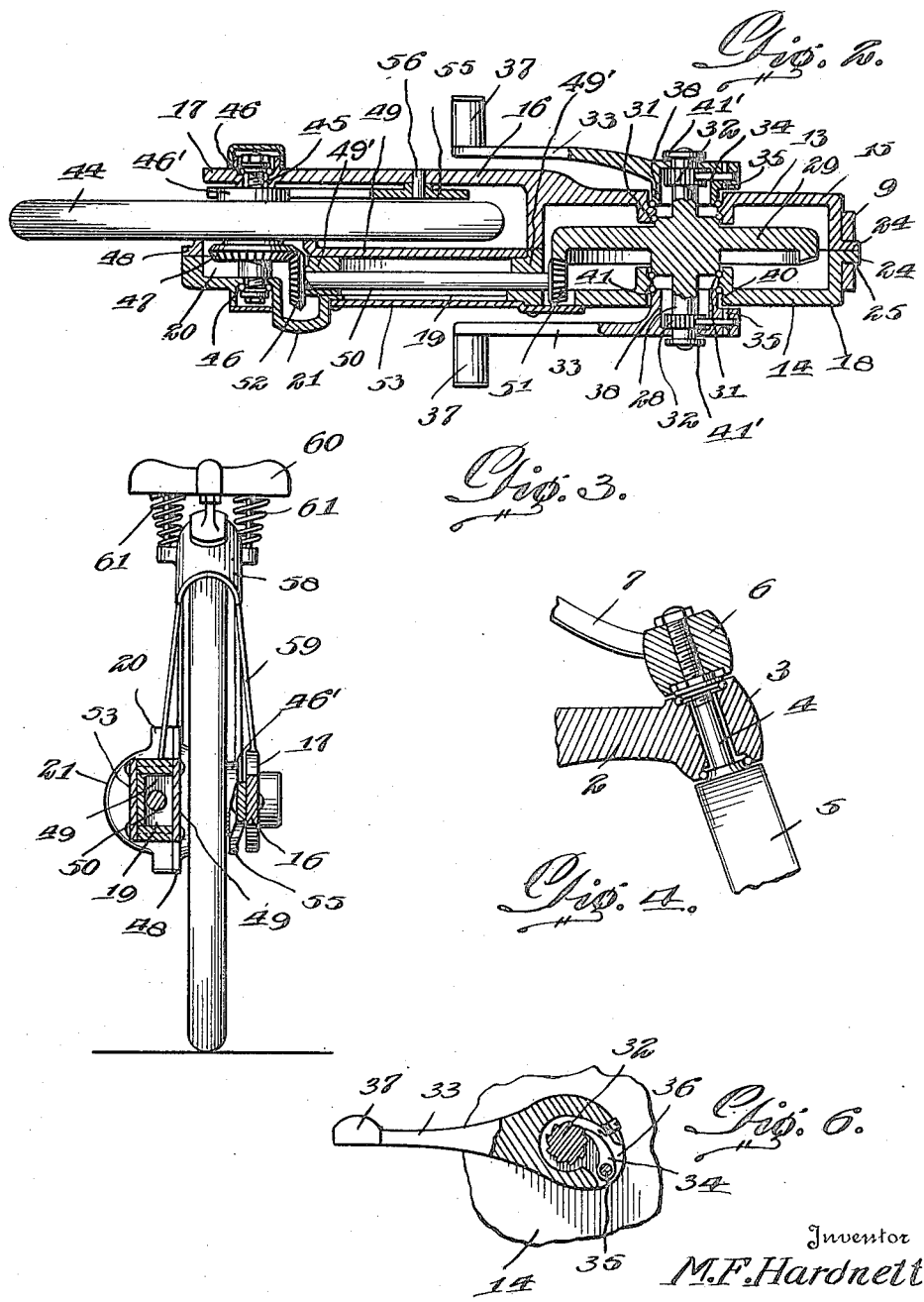

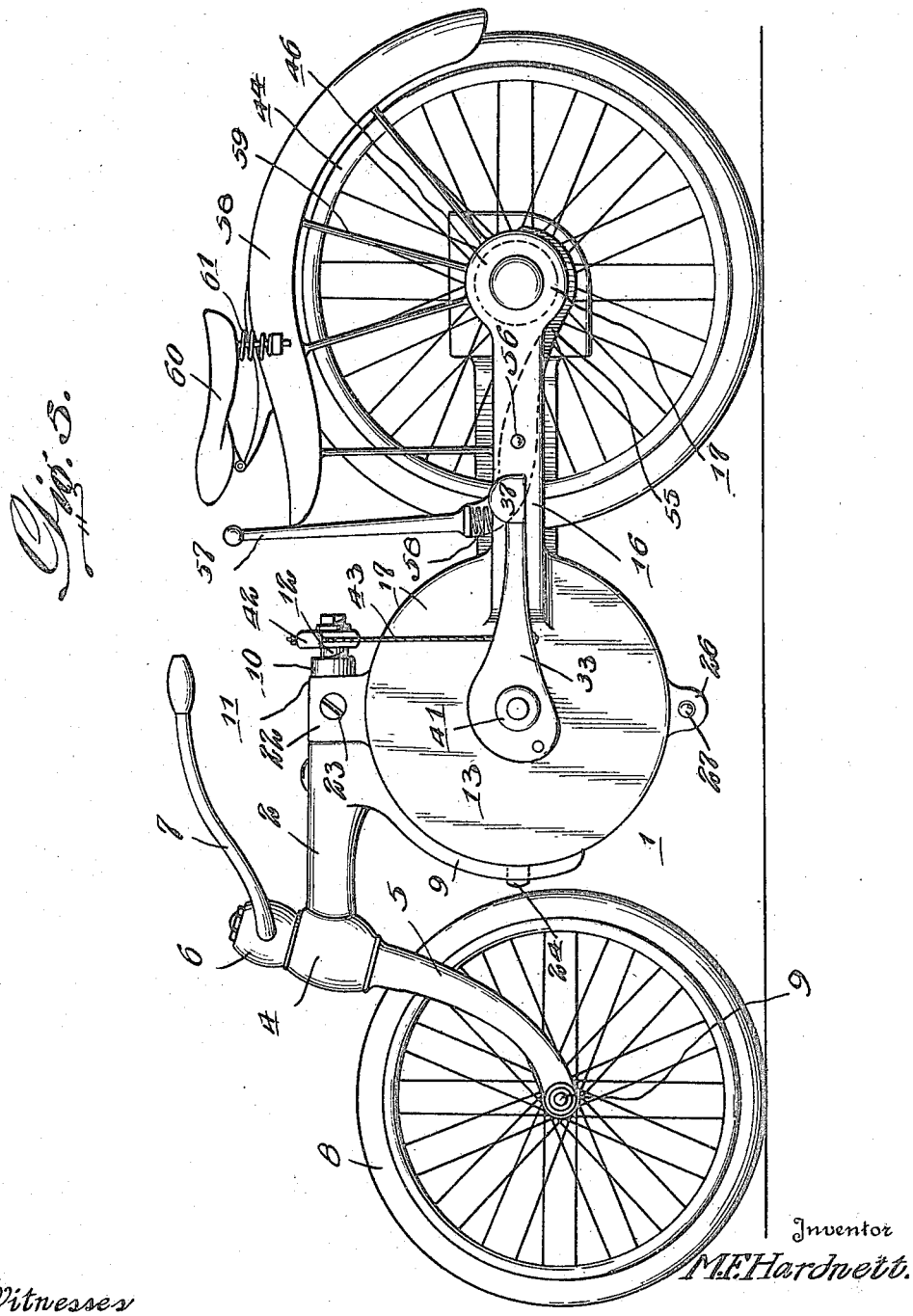

UNITED STATES PATENT OFFICE.

MERRELLON F. HARDNETT, OF ATLANTA, GEORGIA.

BICYCLE-FRAME.

1,222,398.  Specification of Letters Patent.  Patented Apr. 10, 1917.

Application filed December 2, 1916. Serial No. 134,698.

*To all whom it may concern:*

Be it known that I, MERRELLON F. HARDNETT, a citizen of the United States, residing at Atlanta, in the county of Fulton and State of Georgia, have invented new and useful Improvements in Bicycle-Frames, of which the following is a specification.

This invention relates to improvements in bicycles, one object of the invention being to effect improvements in the construction of the frame.

Another object is to provide improved propelling mechanism or gearing for a bicycle and which embodies a pair of reversely movable pedal levers and step by step gearing which connects the pedal levers to the rear wheel and serves to convert the oscillating motion of the levers into rotary motion of the said wheel.

Another object is to effect improvements in the supporting means for the mud guard.

With the above and other objects in view, the invention consists in the features of construction, combination and arrangement of devices, hereinafter described and claimed.

In the accompanying drawings:—

Fig. 2 is a longitudinal horizontal sectional view of the same.

Fig. 3 is a vertical transverse sectional view of the same on the plane indicated by the line 3—3 of Fig. 1.

Fig. 4 is a similar view on the plane indicated by the line 4—4 of Fig. 1.

Fig. 5 is a side elevation showing the reverse side of the bicycle from that shown in Fig. 1.

Fig. 6 is a detailed sectional view.

Figure 1:
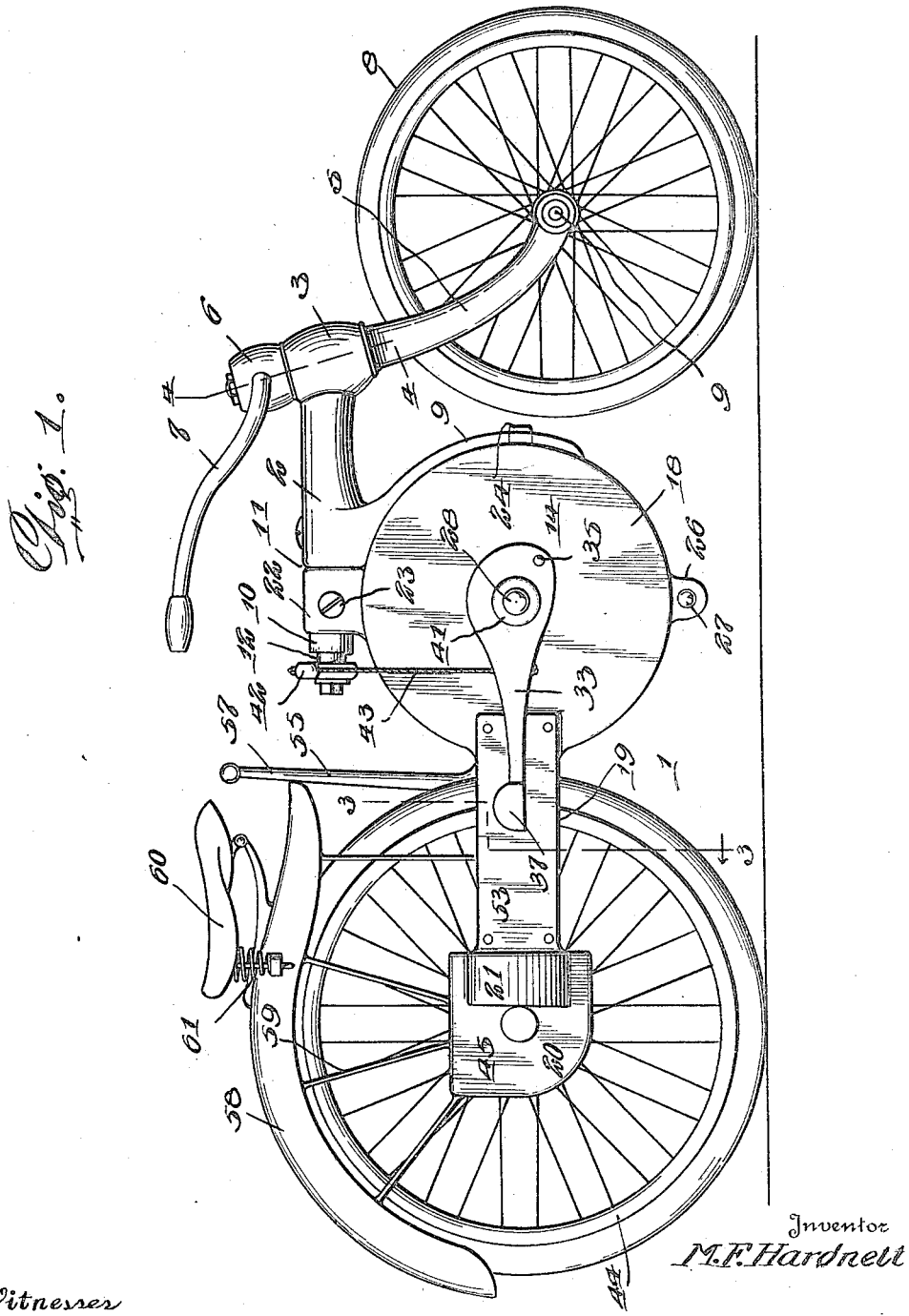
Figure 1 is a side elevation of a bicycle constructed and arranged in accordance with my invention.

The frame 1 includes a front member 2 which is provided at the front end with a bearing 3 in which the spindle 4 of the front or steering fork 5 is mounted, a steering head 6 being secured to the upper end of the spindle and being provided with rearwardly diverging steering arms 7. The usual front wheel 8 has its axle 9 mounted in the lower ends of the arms of the steering fork as shown.

The frame member 2 also has a downwardly extending nearly semi-circular arm 9 and a rearwardly extending substantially horizontal arm 10. The arm 10 has recesses 11 in opposite sides and is provided at its rear end with a spindle 12.

The main portion of the frame comprises a pair of members 13, 14. The member 13 has a circular head 15, an arm 16 which extends rearwardly from the head, and is provided at its rear end with a bearing portion 17. The member 14 has a circular head 18 which bears against the head 15 and said member 18 also has a rearwardly extending arm 19 which is provided at its rear end with a casing member 20 which is hollow on the inner side and which is also provided with an outstanding substantially semi-circular casing arm 21. The heads 15, 18, are provided with upwardly extending lugs 22 which fit in the recesses 11 of the arm 10 and are bolted to said arm by a bolt 23. Said heads also have forwardly extending lugs 24 which engage in an opening 25 of the arm 9. Said heads are also provided on their lower sides with downwardly extending lugs 26 and are secured together by a bolt 27.

A shaft 28 extends through circular openings in the heads 15, 18 and is provided with a centrally arranged crown gear 29 which is held in a recess between the opposing sides of said heads. Said shaft is provided near its ends with ratchet gears 32. A pair of pedal levers 33 are pivotally mounted on the ends of said shaft 28 and are each provided with a spring pressed pawl 34, the said pawls being pivoted as at 35 and being arranged in recesses 36 in said pedal levers, said pawls engaging with said ratchet gears 32. Each lever 33 is provided at its rear end with a pedal 37. Each pedal lever also has an inwardly extending hub portion 38, the inner end of which is arranged in an annular groove 40 of one of the heads and bearing balls 41 are arranged in races in said heads and said hub portions, so that ball bearings are formed for the pedal levers which minimize friction between their hubs and the heads of the frame. Caps 41' are secured to the ends of the shaft 28 and hold the pedal levers in place thereon. A rocking lever 42 is pivotally mounted on the spindle 12 of the arm 10 and its ends are connected by cords or other link members 43, with the pedal levers, so that the pedal levers are arranged for simultaneous movement in reverse directions.

The rear wheel 44 of the bicycle has its axle 45 provided with ball bearings 46 and mounted in bearing openings in the parts 17, 20, and said axle is provided on the side of the rear wheel opposite the part 17 with a bracket disk 46'. On the opposite side of the rear wheel is a crown gear 47 which is arranged in an opening in a plate 48 which covers the inner side of the member 20, said plate having a forwardly extending arm 49 which is arranged on the inner side of the arm 19 and is bolted to said arm. Said arm is hollow in its outer side and is provided with bearings 50 for a shaft 50'. Said shaft has a spur gear 51 at its front end which engages the crown wheel of the shaft 28 and is provided at its rear end with a spur gear 52 which engages the crown wheel of the rear axle. The box or recess in which said shaft and its bearings are arranged is covered on the outer side by a suitable plate 53. It will be understood from the foregoing, that when the pedal levers or either one of them is operated by the user of the bicycle, the shaft 28 is rotated by a step by step movement of said pedal levers and the pawl and ratchet connections between them and said shaft; and that the crown gears, longitudinally arranged shaft and spur gears of the latter convey power to the rear wheel so that the latter is continuously revolved and propels the bicycle.

A brake arm 55 is arranged on the inner side of the arm 16 of the frame member 13, is pivotally mounted as at 56, is adapted to be engaged with and disengaged from the periphery of the bracket disk 46' and is provided at its front end with an upwardly extending lever arm 57 which may be conveniently used by the operator to apply the brake. A spring 58 is provided which normally holds the brake lever in disengaged position.

A mud guard 58 is secured by braces 59 above the rear wheel, said braces being secured to the parts 17, 20 of the frame member. The seat 60 is provided with springs 61 and is supported on the front portion of the mud guard.

From the foregoing description, taken in connection with the accompanying drawings, the advantages of construction and of the method of operation will be readily apparent to those skilled in the art to which the invention relates, and while I have described the principles of operation of the device together with the device which I now consider to be the best embodiment thereof, I desire to have it understood that the device shown is merely illustrative and that such changes may be made when desired as are within the scope of the appended claims.

Having described the invention, what is claimed is:

1. In a bicycle, a frame comprising a front member having a bearing for a front fork and also having a rearwardly extending arm, and a downwardly extending arm; a pair of side members each having a head, a rearwardly extending arm and a bearing member at the rear end of said arm, said heads being secured to said arms of the front member; a driving shaft mounted in the heads, a rear wheel arranged between and having an axle mounted in the bearing members and power transmitting connections between the driving shaft and the rear axle.

2. In a bicycle, a frame comprising a front member having a bearing for a front fork and also having a rearwardly extending arm, and a downwardly extending arm; a pair of side members each having a head, a rearwardly extending arm and a bearing member at the rear end of said arm, said heads being secured to said arms of the front member; a driving shaft mounted in the heads, a rear wheel arranged between and having an axle mounted in the bearing members and power transmitting connections between the driving shaft and the rear axle, ratchet gears on the driving shaft, pedal levers pivotally mounted on the driving shaft and each having a pawl engaging one of the ratchet gears, an oscillating lever pivotally mounted on the rearwardly extending arm of the front frame member, and connections between said oscillating member and said pedal levers.

3. In a bicycle, a frame comprising a front member having a bearing for a front fork and also having a rearwardly extending arm and a downwardly extending arm, said rearwardly extending arm having recesses in opposite sides and said downwardly extending arm having an opening; a pair of side members each having a head provided with an upwardly extending lug in one of the recesses of said rearwardly extending arm, and with a forwardly extending lug arranged in the opening in the downwardly extending arm, a bolt securing the upwardly extending lugs to the rearwardly extending arm, said side members being also each provided with an arm extending rearwardly from its head and with a bearing member at the rear end of the arm; a driving shaft mounted in the heads, a rear wheel arranged between and having an axle mounted in the bearing members and power transmitting connections between the driving shaft and the rear axle.

In testimony whereof I affix my signature.

MERRELLON F. HARDNETT.

Copies of this patent may be obtained for five cents each, by addressing the "Commissioner of Patents, Washington, D. C."